Jan. 14, 1964  B. A. SHADER ETAL  3,117,540
HILL DROP ATTACHMENT FOR PLANTERS
Filed Sept. 12, 1960  2 Sheets-Sheet 1
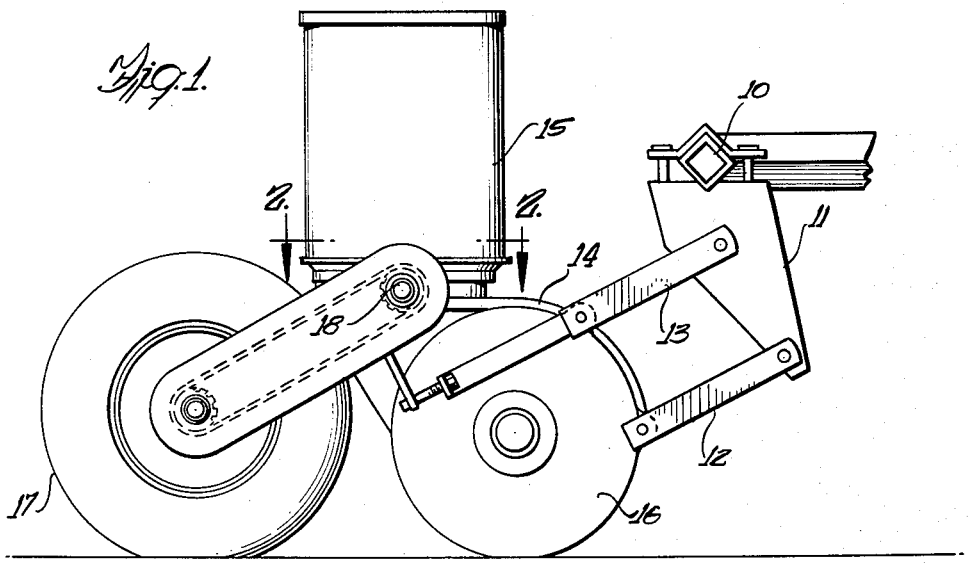
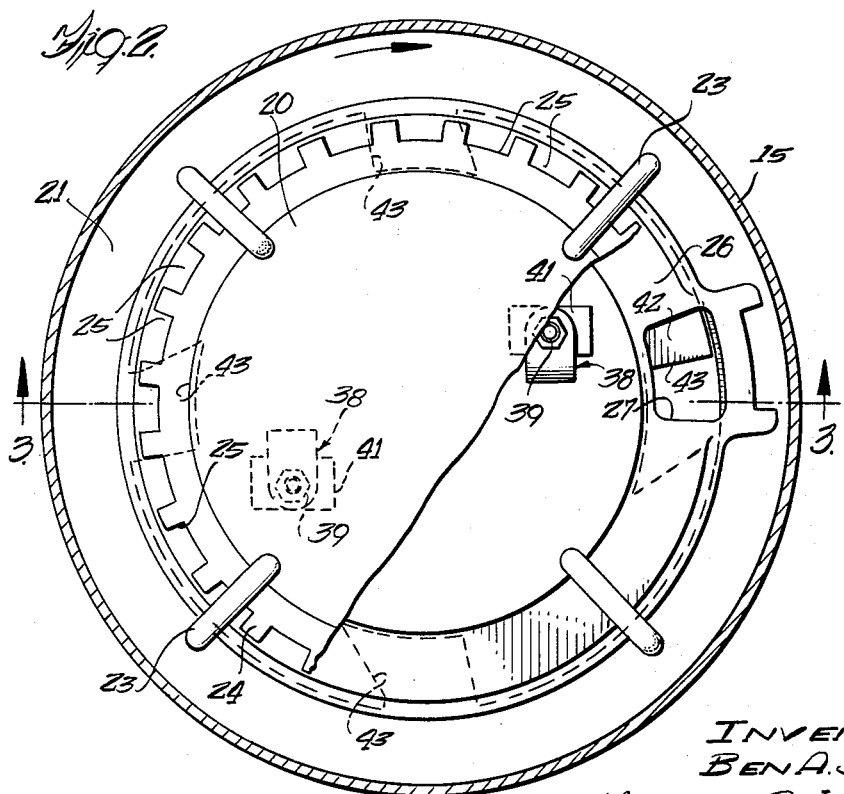
INVENTORS
BEN A. SHADER
MARVIN D. JENNINGS
Paul O. Pippel
ATTORNEY

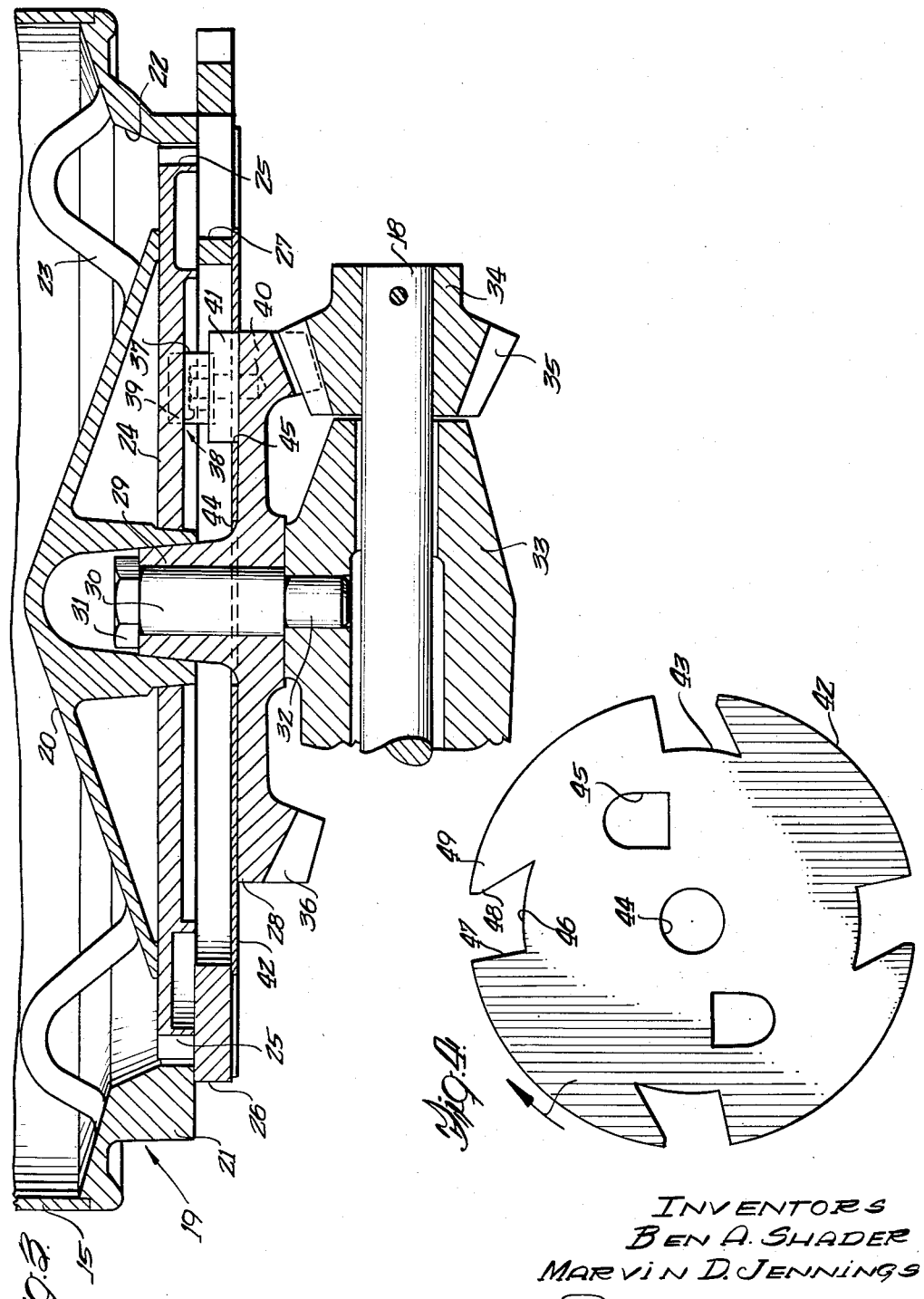

United States Patent Office 3,117,540
Patented Jan. 14, 1964

3,117,540
HILL DROP ATTACHMENT FOR PLANTERS
Ben A. Shader, Hinsdale, and Marvin D. Jennings, Naperville, Ill., assignors to International Harvester Company, Chicago, Ill., a corporation of New Jersey
Filed Sept. 12, 1960, Ser. No. 55,312
2 Claims. (Cl. 111—34)

This invention relates to agricultural implements and particularly to planters of the revolving seed plate type. More specifically, the invention concerns novel hill drop mechanism for a planter.

An object of the invention is the provision, in a planter of the revolving seed plate type having seeds held therein adapted to receive seed from a hopper and discharge it through an outlet in the bottom of the hopper as the cell passes over the outlet, of novel means arranged to periodically close or block the discharge outlet to cause seed to accumulate for discharge in small groups.

Another object of the invention is the provision, in a planter of the type referred to above, of a disk mounted between the seed plate and the hopper bottom plate or ring and having openings therein with spacing therebetween adapted to block the discharge outlet and to receive and accumulate seed dropped from the seed cells, and wherein the openings in the disk periodically register during rotation of the disk with the outlet to discharge the accumulated seed.

Other objects and advantages of the invention will become clear from the following detailed description when read in conjunction with the accompanying drawings, wherein:

FIGURE 1 is a view in side elevation of a planter unit of a conventional and well-known type adapted to be propelled over the ground by any suitable means, not shown;

FIGURE 2 is a sectional view taken through the seed can or hopper of FIGURE 1 along the line 2—2 thereof;

FIGURE 3 is a section taken on the line 3—3 of FIGURE 2, and

FIGURE 4 is a plan view on a smaller scale than that of FIGURE 3 showing the hill drop or accumulator disk of this invention.

The general framework of the planter unit shown in FIGURE 1 forms no part of this invention. It may be understood that the planter unit shown in FIGURE 1 is mounted upon a tool bar 10 to which is clamped a depending plate 11 to which are pivotally connected the forward ends of vertically spaced generally parallel links 12 and 13. The rear ends of links 12 and 13 are pivotally connected to a frame member 14 upon which is mounted a seed hopper 15. A disk furrow opener 16 is carried by the planter frame and mounted rearwardly thereof is a combination gauge and drive wheel 17 having driving connection with a horizontal shaft 18 for driving the planter dispensing apparatus.

At the base of the hopper 15 is a plate 19 comprising a central conical portion 20 and an outer ring portion 21 separated from the part 20 by a channel 22 through which seed from the hopper is discharged by gravity, the parts 20 and 21 being connected by a plurality of bridge members 23.

Below the base 19 there is rotatably mounted a seed plate 24 having seed cells 25 arranged about the periphery thereof and in the form of notches in the periphery of the plate, although it may be understood that, if desired, a concentric row of seed cells may be formed interiorly thereof.

Below the seed plate 24 is a stationary bottom plate or ring 26 having an opening 27 therein with which the seed plate cells 25 will register as the seed plate 24 revolves, the opening 27 forming a discharge outlet through which the seed passes on its way to the ground.

The seed plate 24 is driven by a ring gear 28 having an upwardly projecting bearing portion 29 centrally bored to receive a spindle 30 having a head 31 and a lower reduced diameter portion 32 mounted in a bearing housing 33 rotatably receiving drive shaft 18. A pinion 34 pinned to shaft 18 is provided with teeth 35 meshing with teeth 36 of the ring gear 38.

Rotation of ring gear 28 is transmitted to seed plate 24 by means of lugs 37 formed by bending upwardly leaf springs 38 secured to ring gear 28 by bolts 39 threaded into tapped openings 40 provided in gear 28 and a pad 41 forming part of the ring gear.

Seed dislodged from cells 25 and discharged through outlet 27 in bottom ring 26 are deposited on the ground in the furrow in single file at uniformly spaced locations. It is frequently desirable to plant corn, for example, in spaced rows in which are deposited kernels of corn in groups of 3 or 4 and the like. For this purpose a hill drop or accumulator disk 42 is provided having a plurality of spaced openings 43 arranged around the periphery thereof and having a central opening 44 adapted to fit over the bearing section 29 of ring gear 28.

To assemble the hill drop disk 42 with the ring gear 28, bolts 39 are removed, the disk slipped over the pads 41 on gear 28 and the bolts replaced, passing through openings 45 provided in the disk 42.

Disk 42 is thus securely held to ring gear 28 and revolves therewith and with the seed plate 24 with respect to the hopper and the bottom plate 26. Therefore, the outer area of disk 42 between openings 43 serves periodically to block the outlet 27, so that seed falling from cells 25 are accumulated on the disk 42 within the outlet 27 until one of the openings 43 registers with the outlet 27, whereupon the accumulated seeds are discharged as a group.

In FIGURE 4 the openings 43 are shown as notches formed in the periphery of the disk 42 and in addition to an inner arcuate edge 46, each of the notches has an edge 47, receding with respect to the direction of rotation of the disk, and substantially on the radius of the disk. The leading edge 48 of the notch is at an acute angle to the edge 47 and a line therethrough would intersect an extension of edge 47 beyond the periphery of the disk. By forming the leading edge 48 in this manner corner section 49 is provided in which the seed accumulates as it is scraped off during rotation by the edge of outlet 27 in the bottom ring 26, facilitating the uniform and simultaneous discharge of each of the seeds in the group so that they will fall into the furrow as a group.

It is believed that the novel hill drop mechanism of this invention will be clearly understood from the foregoing description. It should likewise be understood that the invention has been described in its preferred embodiment only, and that modifications may be made therein without departing from the spirit of the invention or the scope of the appended claims.

What is claimed is:

1. In a planter, a seed hopper, a rotatable seed plate at the bottom of the hopper having seed cells arranged about the periphery thereof, a stationary bottom plate below and adjacent the seed plate, said bottom plate having a discharge outlet therein below said seed cells to discharge seed dropped from the seed plate, a driven gear below said bottom plate having a diameter substantially less than that of the seed plate and the bottom plate and having means thereon operatively engageable with said seed plate to revolve the latter, an accumulator disk optionally and removably mounted between the gear and said bottom plate parallel thereto and having a diameter greater than that of said gear and substantially equal to that of the seed plate and the bottom plate, and fastening means carried by the gear for removably securing said accumulator disk thereto for rotation with said gear, said disk having an outer surface arranged to block the outlet in said bottom plate and to intercept and accumulate thereon within said outlet the seed discharged from the seed plate, and said disk having at least one peripheral opening therein periodically registrable with said discharge outlet in the bottom plate to discharge the accumulated seed.

2. In a planter comprising a seed hopper, a seed plate rotatably mounted at the bottom of the hopper having seed cells arranged about the periphery thereof, a stationary bottom plate disposed below and adjacent the seed plate and a drive gear below said bottom plate having a diameter substantially less than that of the seed plate and the bottom plate and operatively connected to the seed plate for driving the latter, said bottom plate having a discharge outlet therein below said seed plate in alignment with said cells to receive and discharge seed dropped from said cells at intervals corresponding to the spacing between the cells in the seed plate, the combination of a hill drop disk having a diameter greater than that of said gear and substantially equal to that of the seed plate and the bottom plate and optionally disposable between and parallel to said drive gear and the stationary bottom plate to close said outlet and retain within said outlet the seed dropped from said cells, and means carried by the drive gear for releasably securing said disk to said drive gear to be driven therewith, said disk having an opening therein registrable with said outlet at each revolution of the disk to discharge through said opening the seed retained in said outlet.

References Cited in the file of this patent
UNITED STATES PATENTS

| | | |
|---|---|---|
| 950,682 | Stickley | Mar. 1, 1910 |
| 1,269,591 | Fischer | June 18, 1918 |
| 1,751,486 | Lutz | Mar. 25, 1930 |
| 1,944,381 | Wamhoff | Jan. 23, 1934 |
| 2,248,922 | Doubet | July 15, 1941 |
| 2,379,724 | Lanham | July 3, 1945 |